Sept. 14, 1965  F. J. NEUGEBAUER ETAL  3,206,381
DROPWISE CONDENSATION DISTILLATION APPARATUS
Filed April 7, 1960  2 Sheets-Sheet 1
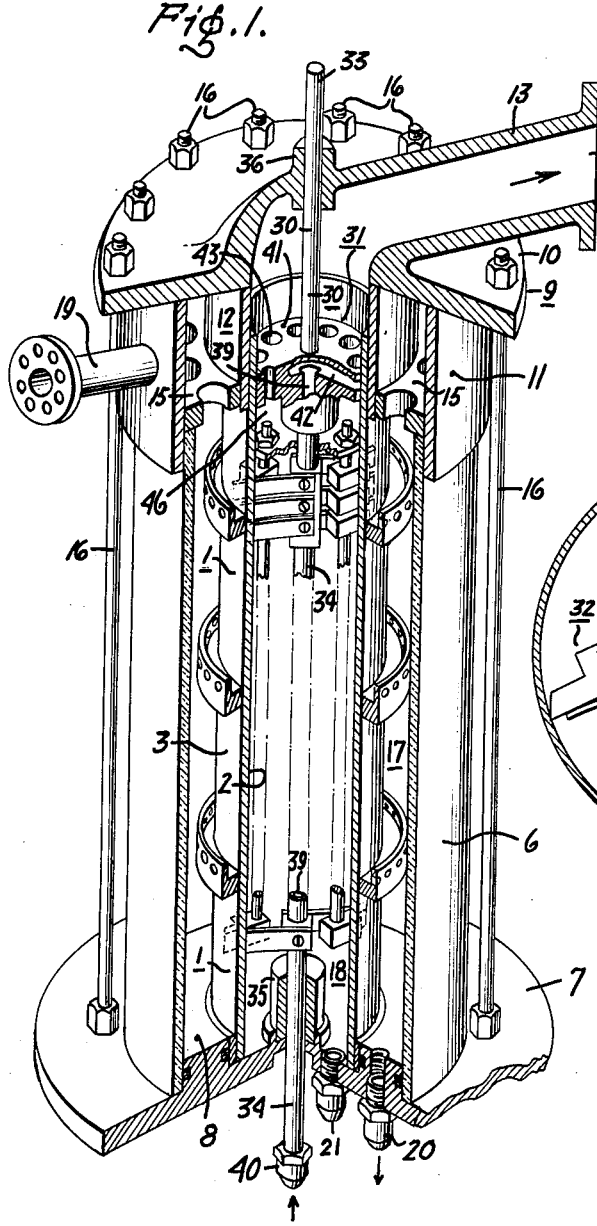
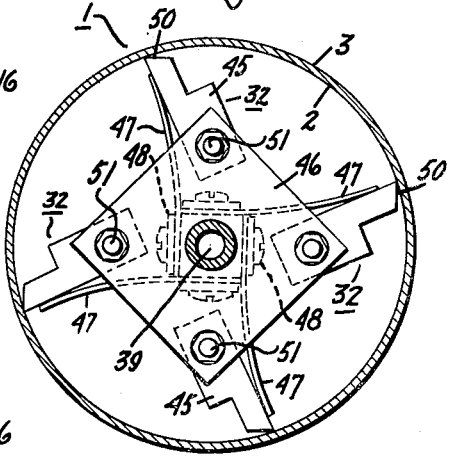
Inventors
Franz J. Neugebauer
Edward L. Lustenader
by Paul A. Frank
Their Attorney United States Patent Office 3,206,381
Patented Sept. 14, 1965

3,206,381
DROPWISE CONDENSATION DISTILLATION APPARATUS
Franz J. Neugebauer, Schenectady, and Edward L. Lustenader, Scotia, N.Y., assignors to General Electric Company, a corporation of New York
Filed Apr. 7, 1960, Ser. No. 20,600
1 Claim. (Cl. 202—185)

The present application is a continuation-in-part of our copending application entitled, "Compression Distillation Apparatus," Serial No. 705,401, filed December 26, 1957, which is assigned to the assignee of the present application.

The present invention relates to a method and apparatus for distillation, and more particularly, to a method and apparatus for distillation utilizing a wiped film evaporating surface and a dropwise condensing surface.

In our copending application there is disclosed a distillation apparatus in which distilland to be distilled is distributed in a thin film over the evaporating surface (inner surface) of a cylindrical heat exchange member by means of a rotating wiper thereby achieving a heat transfer coefficient of approximately 40,000 B.t.u./hr. sq. ft. ° F. (British thermal units per hour, square foot, degree Fahrenheit). Because of the lower heat transfer coefficient experienced on the condensing surface (outer surface) of the heat exchange member the overall heat transfer coefficient of the heat exchange surface, that is, from the condensing vapor to the evaporating vapor, may be approximately 2,000 B.t.u./hr. sq. ft. ° F.

It is well known that of the two types of condensation available, dropwise wherein condensation is initiated in the form of drops and filmwise wherein a continuous film forms, the heat transfer coefficient under normal operating conditions may be many times higher with dropwise condensation. With this in mind, highly polished surfaces have been utilized to promote dropwise condensation. However, after a few hundred hours of operation such condensation degenerates into a mixture of dropwise and filmwise with a much lower heat exchange coefficient. Chemical treatment of surface has also been considered to promote dropwise condensation. However, after a few hundred hours of operation the chemical promoter usually is washed from the surface and condensation tends to revert to filmwise in a manner providing a much lower coefficient of heat transfer.

Other attempts to improve the heat transfer coefficient have employed filmwise condensation in a manner as disclosed in the copending application of Robert Richter, entitled, "Heat Exchange Apparatus and Condensing Surface," Serial No. 806,185, filed April 13, 1959, which is assigned to the assignee of the present application. In that application the condensing surface of the heat exchanger is suitably fluted so as to provide vertical undulations in the surface. By this construction a plurality of crests or outward projections are formed, separated by vertical channels, so that, as condensation of vapor takes place because of the particular shape of the undulations, surface tension causes the condensate to flow into the channels. All drainage from the heat exchange surface is accomplished through these channels thereby substantially increasing the heat exchange coefficient of the condensing surface. In tests wherein the heat exchange apparatus disclosed in our copending application was so modified the condensing surface heat exchange coefficient reached a value of 14,000 B.t.u./hr. sq. ft. ° F., resulting in a possible overall heat transfer coefficient of vapor to vapor in excess of 8,000 B.t.u./hr. sq. ft. ° F.

In achieving these improved results it has been found that the high heat transfer coefficients experienced on the condensing surface are achieved only at low temperature differentials existing between the condensing vapor and the evaporating vapor, for example, in the range of 5° F. (Fahrenheit). As the heat loading which is a function of the temperature differential on the surface is increased, it has been found that the heat transfer coefficient decreases. In utilizing dropwise condensation the heat transfer coefficient increases with increased heat loading. It has been found that with temperature differentials in excess of approximately 15° F., dropwise condensation provides more favorable heat transfer coefficients while with temperature differentials less than approximately 15° F., filmwise condensation, in accordance with the teaching of the Richter construction, is more favorable.

The chief object of the present invention is to provide an improved method and apparatus for distillation utilizing wiped film evaporation and a dropwise condensation.

A further object of the invention is to provide an improved method and apparatus for distillation utilizing a wiped film evaporating surface and a smooth dropwise condensing surface having associated therewith means for continuously promoting dropwise condensation on the smooth surface.

A still further object of the invention is to provide an improved method and apparatus for continuously applying a promoter for continuing dropwise condensation on a heat exchange surface.

These and other objects of our invention will be more apparent from the following description.

Briefly stated, the present invention relates to a distillation apparatus wherein vapor is condensed in the form of droplets on a condensing surface of a heat exchange member, part of a non-wetting material adjacent the surface is transferred to the surface to form at least a molecular thickness of a non-wetting material on the condensing surface to continue the promotion of dropwise condensation, the condensed vapor imparts its latent heat of evaporation through the heat exchange member to the evaporating surface thereof upon which is applied distilland in the form of a thin film, a substantial portion of the distilland being evaporated and the remaining concentrated distilland being drained from the evaporating surface.

The attached drawings illustrate preferred embodiments of the invention in which:

FIGURE 1 is a perspective view, partly in section, of a distilling apparatus having a high heat transfer coefficient on both sides of the heat exchange member;

FIGURE 2 is a sectional view taken through the apparatus shown in FIGURE 1;

Figure 3:
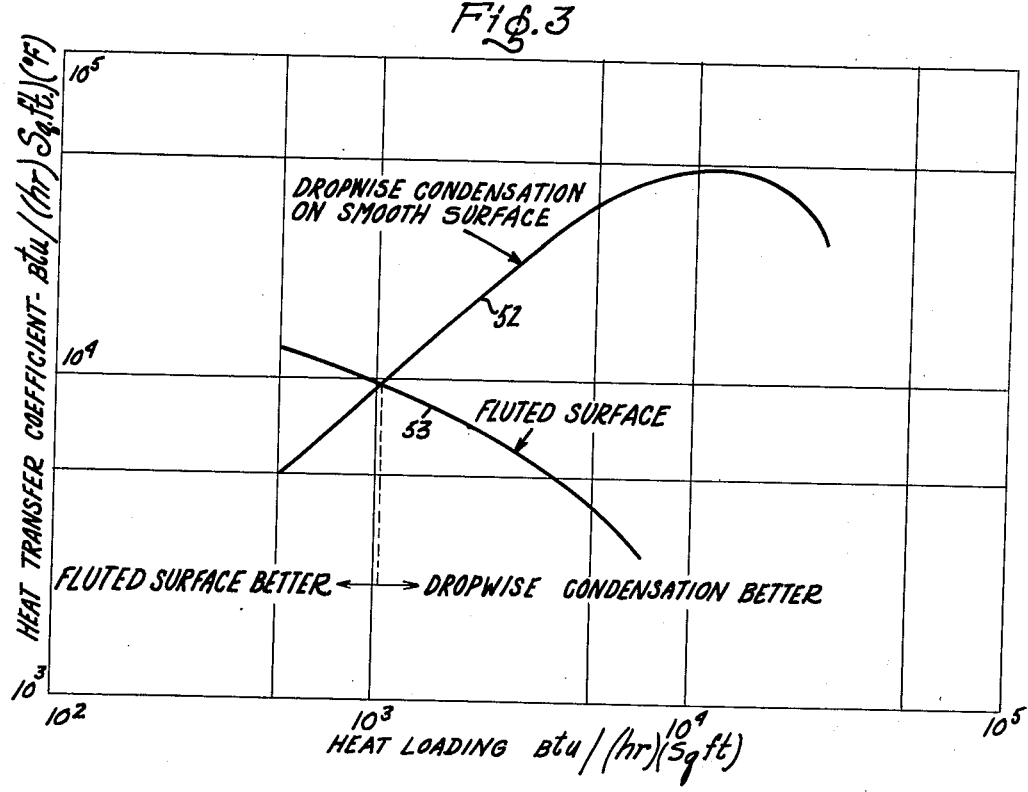
FIGURE 3 is a diagram plotting heat transfer coefficient versus heat loading for condensation surfaces utilizing filmwise condensation and dropwise condensation.

In FIGURE 1 there is shown a perspective view, partly in section, of a distillation apparatus which may be utilized in the present invention. The apparatus comprises a cylindrical heat exchange member 1 which can be seen from FIGURE 2 as having an inner smooth evaporating surface 2 and an outer condensing surface 3. Outer surface 3 may be fabricated or coated with a suitable material such as chromium or titanium having an extremely smooth surface finish and having associated therewith a non-wetting material which erodes or emanates, coating the surface with the non-wetting material having at least a molecular thickness to promote dropwise condensation. This construction and the manner of operation thereof will be more fully described hereinafter.

Heat exchange member 1 may be enveloped by a cylindrical member 6. If desired, a plurality of heat exchange members may be enveloped by cylindrical member 6. Base member 7 having a shoulder portion 8 with suitable sealing means, engages the lower portions of heat exchange member 1 and cylindrical member 6. End member 9 engages the other ends of heat exchange member 1 and cylindrical member 6. This construction defines the first chamber 17 which envelops a second chamber 18. Member 9 comprises a planar flange section 10 having extended therefrom an outer straight flange portion 11 and an inner straight flange portion 12. These straight flange portions may be separated by a suitable perforated spacer member 15. Straight flange portion 11 engages cylindrical member 6 and straight flange portion 12 engages heat exchange member 1. Member 9 may further include discharge outlet means 13 having a discharge passage 14. The entire construction is fastened into a unitary structure by suitable rods 16 which engage base member 7 and flanged member 9 urging the end members into sealing engagement with heat exchange member 1 and cylindrical member 6. Heat exchange medium may be introduced into first chamber 17 through flange connection 19. The heat exchange medium which may be steam is condensed on surface 3. Condensate is discharged from chamber 17 through a suitable connection 20 mounted in base member 7.

Suitable means may be provided to place distilland, such as sea water, into heat exchange relation with the heat exchange fluid condensing on the condensing surface. This means may comprise a water distributing means 31 and a wiping means 32. The purpose of these constructions is to supply distilland to the inner smooth surface 2 of the heat exchange member and to apply this distilland in the form of a thin film.

Water distributing means 31 may comprise a rotor 30 which includes a solid shaft portion 33 journalled in bearing 36, bearing 36 being a portion of end member 9. Rotor 30 further includes a hollow shaft portion 34 which is journalled in bearing 35, bearing 35 being a portion of base member 7. The end of shaft portion 34 is provided with a suitable fitting 40 through which distilland is passed up to distributor plate 41. Distributor plate 41 comprises a plurality of radially extending passages 42 which introduce the fluid passing through passage 39 in shaft 34 to smooth surface 2 of heat exchange member 1. In order to permit communicion between second chamber 18 and discharge passage 14 distributor plate 41 is provided with a plurality of openings 43.

To achieve a high heat transfer coefficient between the distilland and surface 2 of heat exchange member 1, wiping means 32 are provided to apply the distilland in the form of a thin film. Wiping means 32 may comprise a plurality of brushes or wipers 45 having wiping surfaces 50 which are in bearing engagement with surface 2. Brushes 45 are pivotally mounted on a plurality of vertically extending shafts 51 which extend between plates 46 affixed to hollow shaft 34. Hollow shaft 34 has a plurality of flat surfaces with suitable threaded openings therein for mounting centilever springs 47 thereon by means of bolts 48, springs 47 being adapted to bias brushes 45 in a manner as to control the thickness of the film of distilland applied to surface 2.

In the operation of the evaporating portion of the device as shown in FIGURES 1 and 2, distilland which may be sea water or brackish water is introduced through fitting 40 into vertically extending hollow shaft 34. The distilland flows upwardly until it encounters distributing plate 41 wherein radial passages 42 of the distributor plate pass the distilland to surface 2 of the heat exchange member. The distilland flows down the smooth surface 2 and encounters surfaces 50 of the brushes 45 which are biased against surface 2. The thickness of the film of distilland on the surface is determined by the force exerted by the cantilever springs 47, the wiper speed and the width and angle of the engaging surface 50. By proper construction of the springs and brushes, the film of distilland may be sufficiently thin so that it extends substantially only from one wiper to the next when the rotor is actuated. Dryness between wipers may be objectionable since scaling of the heat exchange surface may occur.

The distilland film is in heat exchange relation with heat exchange medium in first chamber 17. The pressure in second chamber 18 wherein the distilland is located is of a magnitude wherein the heat transferred to the distilland is such that the fluid vaporizes and passes upwardly through openings 43 in distributor plate 41 and through discharge passage 14 from the distilling apparatus. Because of the pressure levels under which this apparatus functions, bearing 36 located in member 9 may include a suitable seal. Shaft portion 33 constitutes a connection to an externally located drive means (not shown) which rotates rotor 30. The portion of the distilland which is not vaporized constitutes concentrated solution containing the salts and minerals desired to be separated from the distilland. Concentrated distilland is discharged from chamber 18 through opening 21.

The heat exchange medium which vaporizes the distilland, if desired, may be steam at a higher pressure than that existing in second chamber 18. This heat exchange medium may be introduced through connection 19 into first chamber 17. The heat exchange medium in first chamber 17 is placed in heat exchange relation with the distilland in second chamber 18. As the heat exchange medium condenses on surface 3 its latent heat of evaporation is transferred through heat exchange member 1 to surface 2 where the distilland absorbs the heat and is partly vaporized. As previously noted condensation on surface 3 may be either dropwise or filmwise. Generally, dropwise condensation is more desirable since filmwise condensation on a smooth surface forms an insulating film of heat exchange medium greatly reducing the heat exchange coefficient at the condensing surface. Smooth surfaces of materials such as chrominum, titanium and similar metals promote dropwise condensation for short periods of time. Similarly, surfaces may be chemically treated to promote dropwise condensation. Promoters which may be applied are wax, oleic acid, stearic acid, mercaptan, benzene mercaptan and similar compounds. Unfortunately, polished surfaces after a short period of time no longer promote dropwise condensation and similarly, chemical promoters are washed from the surfaces resulting in a heat exchange action at the condensing surface tending toward filmwise condensation with its lower heat transfer coefficient. For example, the heat transfer coefficient from vapor to surface with dropwise condensation may be of a magnitude of 50,000 B.T.U./hr. sq. ft. °F. After the dropwise condensation phenomenon has degenerated to filmwise condensation, the average heat transfer coefficient may be 2,000 B.T.U./hr. sq. ft. °F. Since the overall heat exchange coefficient for the heat exchange member is approximately the reciprocal of the sum of the reciprocals of the heat exchange coefficients at the condensing surface and the evaporating surface, the decrease in heat exchange coefficient at one surface has an extremely marked effect on the overall heat exchange through the member.

A fluted condensing surface which improves the effectiveness of the heat transfer members is disclosed in the copending Richter application. This construction utilizes filmwise condensation in a manner wherein the surface tension of the condensed fluid causes the fluid to pass from the condensing portions of the surface to drainage channels which rapidly remove condensate from the surface thereby maintaining a high heat transfer coefficient from the condensed vapor to the surface. Filmwise condensation structures of the type disclosed in the Richter application have provided heat transfer coefficients at the surface of a magnitude of 14,000 B.T.U./hr. sq. ft. °F. Extensive tests indicate that fluted surfaces operate exremely well in environments wherein low temperature differentials and low heat loadings are experienced. For example, a heat loading of 500 B.T.U./hr. sq. ft. with a temperature differential between the condensing vapor and the surface of approximately 5° F. may provide the previously mentioned heat transfer coefficient of 14,000 B.T.U./hr. sq. ft. °F. If the heat loading is increased to 1,000 B.T.U./hr. sq. ft. which may be at a temperature differential of 15° F., the heat transfer coefficient of the fluted surface may decrease to 10,000 B.T.U./hr. sq. ft. °F. Similarly, as the heat loading is further increased with larger temperature differentials the heat transfer coefficient decreases. Tests employing dropwise condensation on a surface having a vertical length of approximately 18 inches indicate that with a heat loading of 500 B.T.U./hr. sq. ft. and a temperature differential of 5° F., the heat transfer coefficient may be approximately 5,000 B.T.U./hr. sq. ft. °F. Tests indicate that smooth surfaces experiencing dropwise condensation with a heat loading of 10,000 B.T.U./hr. sq. ft. and at a temperature differential of 25° F. may achieve a heat transfer coefficient in the area of 50,000 B.T.U./hr. sq. ft. °F.

FIGURE 3 is a diagram plotting heat loading versus heat transfer coefficient. Curve 52 is a plot for a smooth surface adapted to promote dropwise condensation ranging from a heat loading of 500 B.T.U./hr. sq. ft. to a heat loading greater than 10,000 B.T.U./hr. sq. ft. Curve 53 is a plot for a fluted surface fabricated in accordance with the teachings of the previously mentioned Richter application. A study of curves 52 and 53 indicates that filmwise condensation on a fluted surface provides higher heat transfer coefficients at lower heat loadings while dropwise condensation provides higher heat transfer coefficients at higher heat loadings. Curves 52 and 53 intersect at approximately a heat loading of 1,000 B.T.U./hr. sq. ft. Both constuctions at this heat loading provide a heat transfer coefficient of approximately 10,000 B.T.U./hr. sq. ft. °F. Accordingly, at heat loadings below 1,000 B.T.U./hr. sq. ft. filmwise condensation on a fluted surface is desirable while at heat loadings above this value dropwise condensation is preferable.

Normally, it is desirable to operate multiple stage distillation apparatus functioning at low temperature differentials to make more efficient use of heat exchange fluid and thereby achieve economical operation. In such constructions the use of the fluted condensing surfaces as disclosed in the Richter application is desirable. In other installations wherein compactness desired or capital investment is small (single stage or limited number of stages), higher heat loadings are utilized in the condensing portion of the distillation apparatus. Dropwise condensation is preferable under such circumstances. Marine applications are an example wherein extremely compact apparatus having heat high loadings are preferred. As previously mentioned, polished surfaces have shown great promise in promoting dropwise condensation, especially, surfaces plated or fabricated of chrominum, titanium and similar metals. Chemically coated surfaces per se do not appear to provide lasting dropwise condensation surfaces.

The present invention envisions providing a dropwise condensation surface for use in a distillation apparatus utilizing the previously described wiped film construction wherein the condensation surface is provided with means for continuously self-applying dropwise condensation promoters on the smooth metal surface of at least a molecular thickness.

Figure 4:
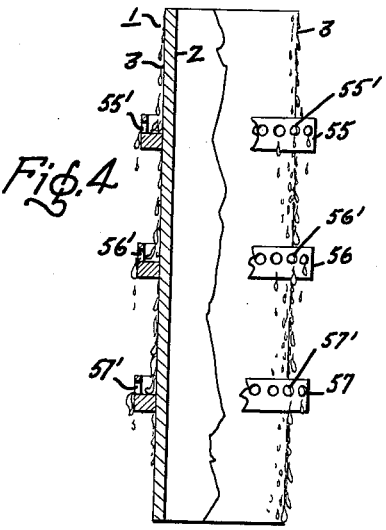
FIGURE 4 is a view, partly in section, of the heat exchange member utilized in the apparatus shown in FIGURE 1.

In FIGURE 4 there is shown an embodiment of such a construction wherein the cylindrical heat exchange member 1 is provided with an outer polished condensing surface preferably plated with chromium, titanium or a similar metal. Adjacent the surface in the first chamber 17 (FIGURE 1) there may be located a member fabricated of a non-wetting material. In FIGURE 1, member 15, for example, may be fabricated of a non-wetting material. Many non-wetting materials may be utilized for this purpose, for example, organic elastomers and resins including fluoro carbon resins, such as those sold under the trade name "Teflon," also silicone resins and rubbers of the type disclosed in Agens Patent 2,448,756, Sprung et al. Patent 2,448,556, or Sprung Patent 2,484,595. Organic polymers may also be utilized such as alkyd resins, vinyl resins, and synthetic rubbers such as butadiene-styrene and butadiene.

The non-wetting material which is placed in the condensing area has a vapor pressure such that during operation of the apparatus a minute quantity of the material erodes or emanates and forms a film-like coating on the area of condensing surface 3 adjacent the material. This coating of non-wetting material, which is of the order of at least a molecular thickness, promotes dropwise condensation. In operation, the coating on the condensing surface may be washed away. However, because of the continuous coating action there is continually applied to the surface more of the non-wetting material thereby assuring continuous dropwise condenstion without encountering the deterioration of the coating experienced in the prior art.

In the previous consideration of heat transfer coefficients it is noted that curve 52, in FIGURE 3, is for a surface having a vertical length of approximately 18 inches. Condensate from the upper portions of the surface constantly drains downwardly collecting other droplets of water as it passes toward the ultimate drainage area, which in FIGURE 1 is the lower portion of chamber 17 adjacent discharge outlet 20. Under such circumstances the upper portions of the heat exchange surface may display extremely good heat transfer coefficients which detriorate to lower values at the lower portions of the heat exchange surface because the condensed vapor substantially forms an insulating film around the heat exchange surface. Means may be provided for removing condensate from the condensing surface in areas where the drainage of the condensed vapor forms drainage films on the surface tending to decrease the heat transfer coefficient of the surface in the particular area.

In FIGURE 4 a plurality of annular troughs are mounted on heat exchange surface 3 at approximately 18 inch levels for the purpose of collecting condensate and removing it from the surface at points adjacent the area of condensation so that the overall heat transfer coefficient of the heat exchange member is maintained relatively high. In this particular embodiment the annular trough construction is mounted on the heat exchange surface and has a general L cross-section. Three troughs 55, 56 and 57 are utilized, condensate from above trough 55 passing downwardly into trough 55 and being discharged through openings 55' therein causing the liquid condensate to pass away from surface 3. Condensate forming between troughs 55 and 56 drains into trough 56 and is discharged through openings 56'. Similarly, condensate from the surface of the heat exchange member between troughs 56 and 57 is collected in trough 57 and passed through openings 57' therein. Condensate forming below trough 57 drains into the lower portion of chamber 17 (FIGURE 1).

Under certain circumstances it may be desirable to incorporate the self-applying dropwise condensate promoter function and the draining function into a single means such as the drainage troughs 55, 56 and 57, the troughs being fabricated of any of the previously mentioned non-wetting materials. The erosion, or emanation, of non-wetting material to coat surface 3 can be easily achieved by mounting the non-wetting material directly on the condensing surface. It is to be understood that the amount of non-wetting material vaporized or eroded and deposited on the condensing surface is extremely minute so that even over long periods of operation there is no appreciable decrease in the dimensions of troughs 55, 56 and 57.

Figure 5:
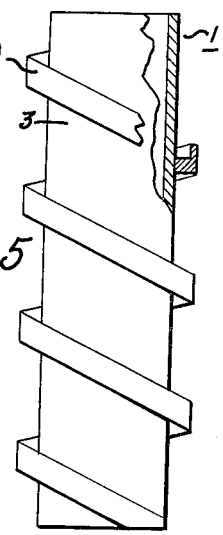
FIGURE 5 is a view in elevation of another embodiment of the heat exchange member shown in FIGURE 4 for use in the apparatus shown in FIGURE 1.

Another embodiment of the invention is shown in FIGURE 5 wherein the trough 60 is helically mounted about condensation surface 3 in such a manner that condensate rather than being passed through openings in the trough as provided in FIGURE 4 is continuously passed down the sloping trough to the lower portion of the condensing chamber. Droplets forming on the surface pass downward to the adjacent portion of the helically wound trough and are discharged into the lower portion of the condensing chamber. If desired, the trough may also be fabricated of a non-wetting material so that the trough incorporates therein the dropwise condensation promoting function.

While the present invention has been described with particular reference to distillation apparatus adapted to render brine solution, such as sea water, potable, it may be utilized also to economically concentrate other liquids and food products while avoiding high temperatures of distillation having an adverse effect upon the fluids being concentrated. The invention may also be utilized in multiple stage systems wherein the distillate is utilized as heat exchange medium for an adjacent stage. This is possible since the amount of eroded material utilized for promoting dropwise condensation is extremely small and does not measurably contribute to the impurity level of the condensed vapor.

While we have described the preferred embodiment of the invention it will be understood that the invention is not limited thereto since it may otherwise be embodied within the scope of the appended claim.

What we claim as new and desire to secure by Letters Patent of the United States is:

A condensing surface comprising a smooth surface oriented in a general vertical direction, draining means mounted on the surface at various levels adapted to collect condensed heat exchange vapor from the surface, said draining means being fabricated of a material which is nonwetting with respect to condensed heat exchange vapor, said material having sufficient vapor pressure to vaporize in said heat exchange vapor and said condensing surface being preferentially wetted by condensed nonwetting material as opposed to condensed heat exchange vapor so that upon contact with condensing heat exchange vapor and vaporized nonwetting material said surface is coated with condensed nonwetting material having droplets of condensed heat exchange vapor thereon.

References Cited by the Examiner

UNITED STATES PATENTS

| | | | |
|---|---|---|---|
| 2,353,551 | 7/44 | Dexter | 202—64 |
| 2,447,746 | 8/48 | Ferris | 202—64 |
| 2,734,023 | 2/56 | Hickman | 202—64 |
| 2,893,900 | 7/59 | Machlin | 117—106 X |
| 2,919,115 | 12/59 | Vaaler. | |
| 2,923,640 | 2/60 | Buckingham. | |

FOREIGN PATENTS 765,743  1/57  Great Britain.

OTHER REFERENCES

Emmons: "The Mechanism of Drop Condensation," Trans. A.I.CH.E., vol. 35, 1939, pages 113–116.

Fitzpatrick, et al.: "Dropwise Condensation of Steam on Vertical Tubes," Trans. A.I.CH.E., vol. 35, 1939, pages 97–107.

NORMAN YUDKOFF, *Primary Examiner.*

GEORGE D. MITCHELL, ALPHONSO SULLIVAN, MILTON STERMAN, RICHARD D. NEVIUS,
*Examiners.*